United States Patent

Hiroshi et al.

[11] Patent Number: 4,742,897
[45] Date of Patent: May 10, 1988

[54] WHEEL CYLINDER WITH SELF-CONTAINED AUTO-ADJUSTER

[75] Inventors: Hirashita Hiroshi; Masahiko Uchiyama, both of Saitama, Japan

[73] Assignee: Akebono Brake Industry Company, Ltd., Tokyo, Japan

[21] Appl. No.: 936,158

[22] Filed: Dec. 1, 1986

[30] Foreign Application Priority Data

Nov. 29, 1985 [JP] Japan .................... 60-267233
May 29, 1986 [JP] Japan .................... 61-122146

[51] Int. Cl.⁴ .......................................... F16D 65/46
[52] U.S. Cl. ...................... 188/196 D; 188/71.9; 188/72.9; 188/106 A; 188/106 F; 188/196 BA; 188/196 F; 188/343; 188/364; 188/79.51
[58] Field of Search ............ 188/79.5 GE, 71.9, 72.7, 188/106 A, 106 F, 196 BA, 196 D, 196 F, 343, 364

[56] References Cited

U.S. PATENT DOCUMENTS

| | | | |
|---|---|---|---|
| 2,175,446 | 10/1939 | Rasmussen et al. | 188/79.5 GE |
| 2,196,799 | 4/1940 | Keplinger | 188/79.5 GE |
| 2,937,725 | 5/1960 | Newell | 188/196 BA |
| 3,482,664 | 12/1969 | Backmann | 188/79.5 GE |
| 3,540,554 | 11/1970 | Burnett et al. | 188/364 |
| 3,712,425 | 1/1973 | Torii et al. | |
| 3,737,011 | 6/1973 | Reinartz | 188/79.5 GE |
| 3,811,538 | 5/1974 | Farr | 188/79.5 GE |
| 3,811,539 | 5/1974 | Farr | 188/196 D |
| 3,838,757 | 10/1974 | Farr | 188/196 D |
| 4,085,830 | 4/1978 | Bottoms et al. | 188/196 D |
| 4,530,424 | 7/1985 | Fukuzawa et al. | |

FOREIGN PATENT DOCUMENTS 0178030 10/1983 Japan .................... 188/79.5 GE

*Primary Examiner*—Andres Kashnikow
*Assistant Examiner*—Mark T. Le
*Attorney, Agent, or Firm*—Finnegan, Henderson, Farabow, Garrett & Dunner

[57] ABSTRACT

A self adjusting wheel cylinder for a drum brake including a brake drum and a brake shoe for exerting braking pressure on the drum with a shoe gap formed therebetween comprising a cylinder including an opening therein, hydraulic piston slidably mounted in the opening for activating the brake shoe upon movement in one direction, and for releasing the brake shoe upon movement in the other direction, and multiple adjusting screws within the cylinder for automatically adjusting the limit of movement of the piston in response to changes in the shoe gap of the brake, the multiple adjusting screws including a spindle having external screw-threads on both ends, the spindle is threadably mounted within the piston to one end thereof, and has a pair of multiple drive screws on the other end of the spindle for defining a fixed movement limit of the piston. A nut is attached to the multiple drive screws, the nut being adapted to rotate relative to the spindle when the brake is applied and the spindle being adapted to rotate relative to the nut and the piston when the brake is released.

12 Claims, 4 Drawing Sheets

WHEEL CYLINDER WITH SELF-CONTAINED AUTO-ADJUSTER

BACKGROUND OF THE INVENTION

This invention relates to a wheel cylinder containing an auto-adjuster for a drum brake.

An auto-adjuster of the type disclosed by U.S. Pat. No. 3,712,425, is intended for use in a two leading shoe brake. The auto-adjuster of this type is operated in a space exposed to the air, and the adjusting operation may become unstable because of mud, or foreign particles and the like adversely affecting the component parts thereof.

The prior art further includes a structure disclosed by U.S. Pat. No. 4,503,424 in which an auto-adjuster is contained in a wheel cylinder for a two leading shoe brake. In this auto-adjuster, however, the quantity of the adjustment of the gap between shoes is determined only by the pitch of a multiple thread. Since this adjustment is of a one-shot type in which the adjustment is completed within one round of brake operation, the quantity of the adjustment tends to be affected by the heat distortion of a brake drum. Moreover, the piston in this device is unduly complicated to construct.

SUMMARY OF THE INVENTION

Accordingly, an object of the present invention is to provide an improved auto-adjuster apparatus for adjusting the gap between brake shoes. More specifically, an object of the invention is to mount an auto-adjuster apparatus in a wheel cylinder so that the parts thereof are protected from mud, and other foreign particles, and stable operation of adjustment is consistently obtained.

Another object of the present invention is to provide a wheel cylinder with a self-contained auto-adjuster for a drum brake wherein the gap between the brake shoes may be finely adjusted according to the difference between the pitch of the adjusting screws and the pitch of multiple drive screws, and wherein the gap therebetween is prevented from being excessively modified by heat deformation of the brake drum when the brake force is applied.

Additional objects and advantages will be obvious from the description which follows, or may be learned by practice of the invention.

To achieve the foregoing objects and advantages, the self-adjusting wheel cylinder for a drum brake of the present invention includes a brake drum and a brake shoe for exerting braking pressure on the drum with a shoe gap formed therebetween. In accordance with the invention, the cylinder comprises cylinder means including an opening therein, hydraulic piston means including at least one piston slidably mounted in the opening for activating the brake shoe upon movement in one direction, and for releasing the brake shoe upon movement in the other direction, and multiple adjusting screw means within the cylinder for automatically adjusting the limit of movement of the piston in response to changes in the shoe gap of the brake.

It is preferred that the piston means include first and second opposed pistons.

The screw means preferably includes a spindle threadably mounted within the piston to one end thereof, a pair of multiple drive screws on the other end of the spindle for defining a fixed movement limit of the piston, and nut means for attachment to the multiple drive screws. The nut means may include a nut having a conical head face, and the cylinder may include a corresponding convex clutch face surface for mating contact with the conical head face.

It is preferred that the nut includes an annular side thereon, and that the nut means also include a retainer fixed to the cylinder, a bearing abutting the annular side of the nut, and spring means between the retainer and the bearing for biasing the conical head face of the nut toward the clutch face.

Alternatively, the screw means may include a fixed screw mounted within the second piston and fixed against axial rotation; a spindle coupled to the fixed screw; and nut means threadably attached to the other end of the spindle.

The first piston may include a cavity therein having a conical concave head face on one end thereof, and the nut means may include a nut threadably attached to the spindle within the cavity, the nut including a conical convex face for mating contacting with the concave face of the cavity, and a retainer fixed in the cavity for defining a fixed gap between the nut and the retainer when the concave and convex faces are in contact with one another.

A plunger may be slidably mounted in the cylinder in alignment with the spindle and a wedge member may be coupled to the brake shoe. The plunger includes a cut-out portion sized for receiving the wedge member for locking the brake shoes against the brake drum. A gear also may be mounted on the other end of the piston for manual adjustment of the brake.

The brake shoe may include a catch member, and the cylinder may include a circular hole in the piston for attachment to the catch member, and friction ring means in the hole for reducing relative vibrational motion between the catch member and the piston.

BRIEF DESCRIPTION OF THE DRAWINGS

The accompanying drawings, which are incorporated in and constitute a part of the specification, illustrate an embodiment of the invention, and, together with the description, serve to explain the principles of the invention.

Of the drawings.

DESCRIPTION OF THE PREFERRED EMBODIMENT

Reference will now be made in detail to the present preferred embodiment of the invention, an example of which is illustrated in the accompanying drawings.

In accordance with the invention, the self-adjusting wheel cylinder for a drum brake includes a brake drum and a brake shoe for exerting braking pressure on the drum with a shoe gap formed therebetween. The cylinder comprises cylinder means including an opening therein, hydraulic piston means including at least one piston slidably mounted in the opening for activating the brake shoe upon movement in one direction, and for releasing the brake shoe upon movement in the other direction, and multiple adjusting screw means within the cylinder for automatically adjusting the limit of movement of the piston in response to changes in the shoe gap of the brake.

Figure 1:
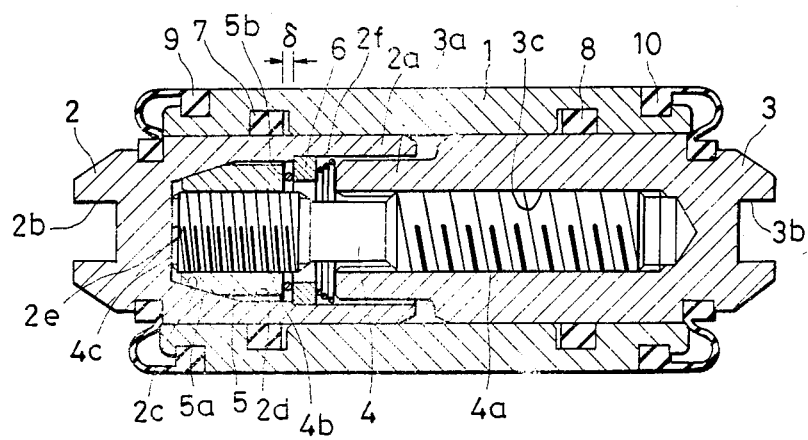
FIG. 1 is a sectional view of a wheel cylinder with a self-contained auto-adjuster for a drum brake according to the present invention.

As embodied herein and as shown in FIG. 1, the wheel cylinder 1 having a self-contained auto-adjuster comprises a cylinder body 1 fixed to a backing plate located outside the drawing. Pistons 2, 3 are slidably contained in the cylinder body 1, with the inner edge portion 3a of the second piston 3 being fitted into the inner edge portion of the first piston 2. The outer edge portions of both the pistons 2, 3 have forked jaws 2b, 3b for mating with a pair of brake shoes (not shown). A spindle 4 is provided with a screw 4a at one end thereof. The screw 4a unrotatable by axial force is coupled to an inner screw 3c in the axial direction of the second piston 3. The other end of spindle 4 is screwed into a nut 5 on a screw thread 4b rotatable by the axial force.

With respect to the screw 4b which is rotatable by the axial force, the flank angle is set so that the lead angle is greater than an angle of friction. As for the screw unrotatable by axial force, the flank angle is such that the lead angle is smaller than the angle of friction. The screw 4b is the isotropic one whose lead is greater than that of the screw 4a. Moreover, a cavity 2f formed with a conical concave head face 2c at the bottom and a cylindrical face 2d is provided on the inner edge side of the first piston 2. A conical convex head face 5a that can be fitted to the conical concave face 2c of the first piston 2 is formed and both the concave and convex faces 2c, 5a constitute a clutch. A retainer 6 is forced into and fixed to the cylindrical face 2d of the cavity 2f of the first piston 2, and the conical convex head face 5a is made to abut against the conical concave head face 2c of the first piston 2, leaving a fixed gap δ between the left side of the retainer 6 and the right side 5b of nut 5 while the clutch is connected. In other words, the nut 5 is capable of moving in the axial direction, together with the spindle 4 within the range of the fixed gap without revolving. To reduce frictional resistance of the nut 5 sliding on the retainer 6, a low frictional member, e.g., a ball bearing, preferably should be mounted therebetween. Reference numerals 7 and 8 designate seal rings. Dust boots 9, 10 are used to cover the gaps between the both ends of cylinder 1 and the pistons 2, 3, respectively.

Figure 4:
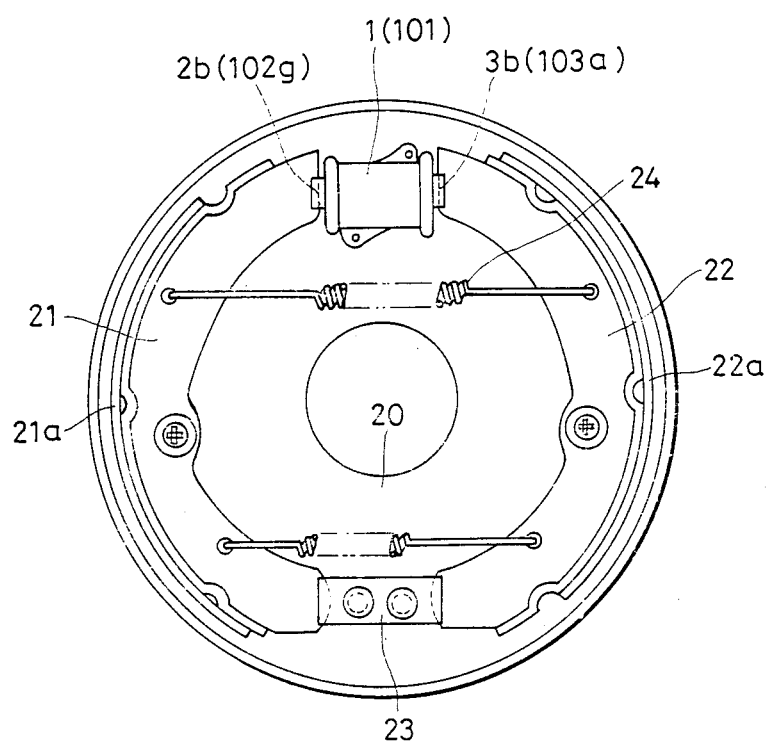
FIG. 4 is a schematic view of a leading trailing shoe brake with the wheel cylinder of either FIG. 1 or 2 applied thereto.
Figure 5:
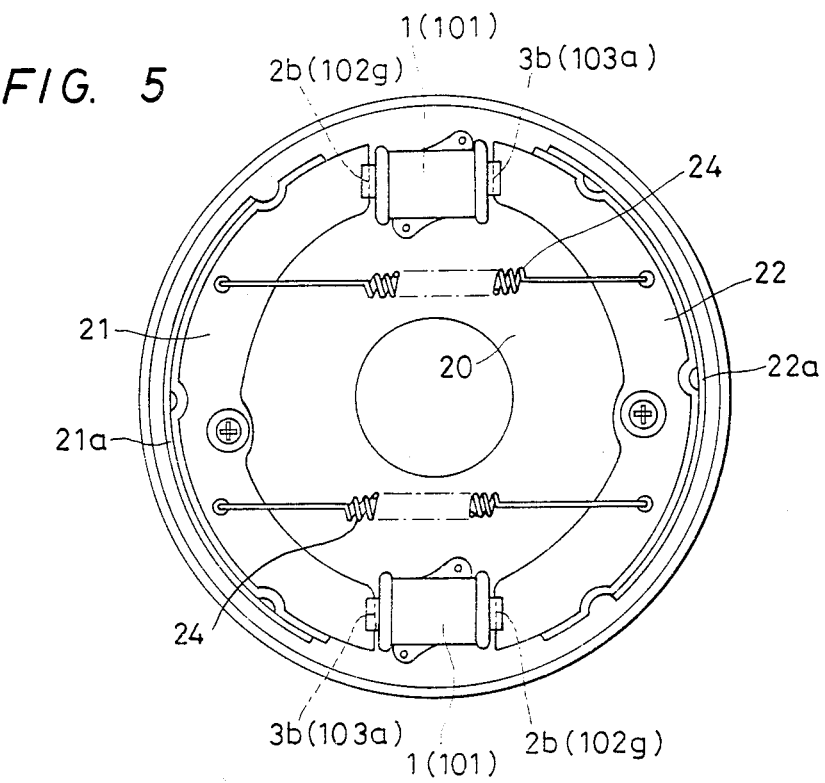
FIG. 5 is a schematic view of a two leading two-way brake with the wheel cylinder of either of FIG. 1 or 2 applied thereto.

In the wheel cylinder thus constructed with a self-contained auto-adjuster, the cylinder body 1 is arranged on a backing plate 20, as shown in FIG. 4 in the case of a leading trailing shoe brake. Such bodies also may be vertically symmetrically arranged thereon, as shown in FIG. 5 in the case of two-leading two-way shoe brake, where both ends of brake shoes 21, 22 mate with the jaws 2b, 3b of the pistons 2, 3, respectively. In FIG. 4, an anchor member 23 is loaded with brake torque when the brake is applied. Numeral 24 in FIGS. 4, 5 designates a shoe return spring.

The operation of the auto-adjuster will subsequently be described. When the brake is not applied, the brake shoes 21, 22 are returned by the shoe return spring 24 to the original positions, and the pistons 2, 3 are forced into the cylinder body 1. As shown in FIG. 1, the conical convex head face 5a of the nut 5 is caused to abut against the conical concave head face 2c of the first piston 2. One edge face of the spindle 4 is allowed to abut against the bottom 2e of the cavity 2f of the first piston 2. The fixed gap δ is formed between the right edge face 5b of the nut 5 and the left edge face of the retainer 6.

When hydraulic oil is introduced into the cylinder body 1 from outside, the pistons 2, 3 move away from each other and enlarge the gap between the edge faces of the brake shoes 21, 22, thus causing linings 21a, 22a to frictionally mate with the inner peripheral face of the rotating brake drum (not shown) to produce braking force. In case the linings 21a, 22a of the brake shoes 21, 22 have worn off, thus allowing the gap between the brake drum and the shoe to enlarge, both the pistons 2, 3 continue moving away from each other until the nut 5 abuts against the retainer 6. Consequently, the nut 5 rotates on the screw 4b of the spindle 4 and is screwed out of the spindle 4.

When the hydraulic oil is descharged, the pistons 2, 3 are forced back into the cylinder body 1 under the action of the shoe return spring 24, and the conical concave head face 2c of the first piston is caused to abut against the conical convex head face 5a of the nut 5. This sets up the clutch connection. The rotation of the nut 5 is retained and consequently the spindle 4 is rotated by the nut 5. The spindle 4 is screwed out of the second piston 3 under the action of the screw 4a, and the front end of the spindle 4 abuts against the bottom 2e of the first piston 2. The adjusting operation is thus terminated.

Since the lead of the screw 4b is greater than that of the screw 4a, the length of the spindle 4 screwed out of the second piston 3 is comparatively small in relation to the movement of the first piston 2 beyond the fixed gap δ. Excessive adjustment based on the deformation of the brake drum because of overheating can thus be avoided.

Figure 2:
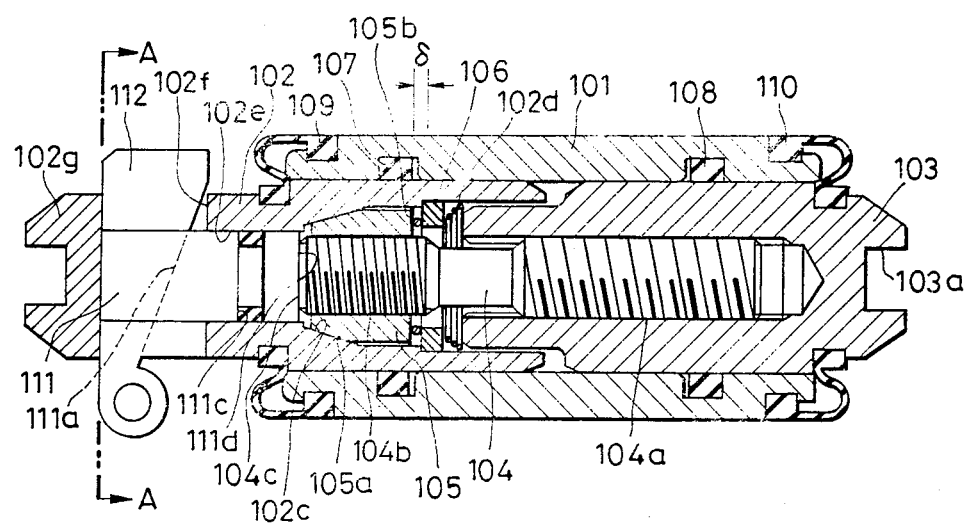
FIG. 2 is a sectional view of another wheel cylinder embodying the present invention.
Figure 3A:
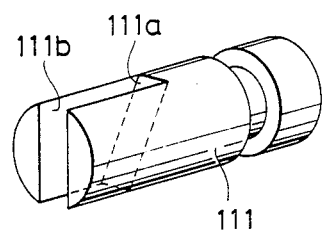
FIG. 3(a) is a perspective view of a plunger for use in the wheel cylinder of FIG. 2.
Figure 3B:
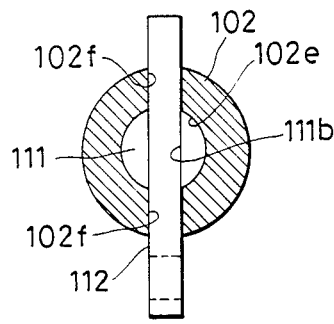
FIG. 3(b) is a sectional view taken on line A—A of FIG. 2.

Referring to FIGS. 2, 3, a second working example will be described. As shown therein, the wheel cylinder comprises a cylinder body 101, a first piston 102, a second piston 103, a spindle 104, a nut 105, a retainer 106, seal rings 107, 108 and dust boots 109, 110. As in the case of the first example, the spindle 104 is attached to the nut 105 by a screw 104b rotatable by axial force, and the piston 103 is attached to a screw 104a unrotatable by axial force. Moreover, the conical convex head face 105a of the nut 105, and a conical concave head face 102c formed in the cavity 102d of the piston 102 act as a clutch.

A through-hole 102e concentric with the spindle 104 and communicating with the cavity 102d is formed in the outer end portion of the first piston 102. At the front end of the through-hole 102e is a plunger 111 (see FIG. 3(a)) having a tilted face as its bottom and a groove 111b for receiving a wedge member 112. The plunger 111 is fitted with a seal ring 111c to maintain the liquid density in the first piston 102. A through-hole 102f perpendicular to the through-hole 102e including its axis core is provided at the front end of the first piston 102 to allow the wedge member 112 to pass therethrough (see FIG. 3(b)). Moreover, a forked jaw 102g for receiving and mating with the end of the brake shoe is formed at the outermost end of the first piston 102.

In the wheel cylinder thus constructed with a self-contained auto-adjuster, the cylinder body 1, as described in the first example, is held between both ends of the brake shoes 21, 22, as shown in FIGS. 4, 5. The ends of the brake shoes 21, 22 are mated with the jaws 102g, 103a of the first and second pistons 102, 103, respectively.

The operation of this embodiment now will be described.

When hydraulic oil is introduced into the cylinder body from outside to apply the service brake, the operation is substantially the same as described in the first example, except that one edge face of the spindle 104 abuts against the inner edge face 111d of the plunger 111.

During the time the parking brake is applied, the wedge member 112 is forced into the gap between the face on the jaw side 102g of the groove 102f of the first piston and the tilted face of the plunger 111. The piston 102 is pushed out as the through-hole 102e is guided by the plunger 111. The brake shoe 21 or 22 abuts against the inner peripheral face of the brake drum (not shown) and the counterforce is transmitted to the brake shoe 22 or 21 through the wedge member 112, the plunger 111, spindle 104 and the second piston 103 to cause the brake shoe 22 or 21 to abut against the inner peripheral face of the brake drum, so that braking force is generated.

Both the brake shoes 21, 22 are returned to the original positions by returning the wedge member 112 to the orignal position under the action of the shoe return spring 24 to release the brake.

Figure 6:
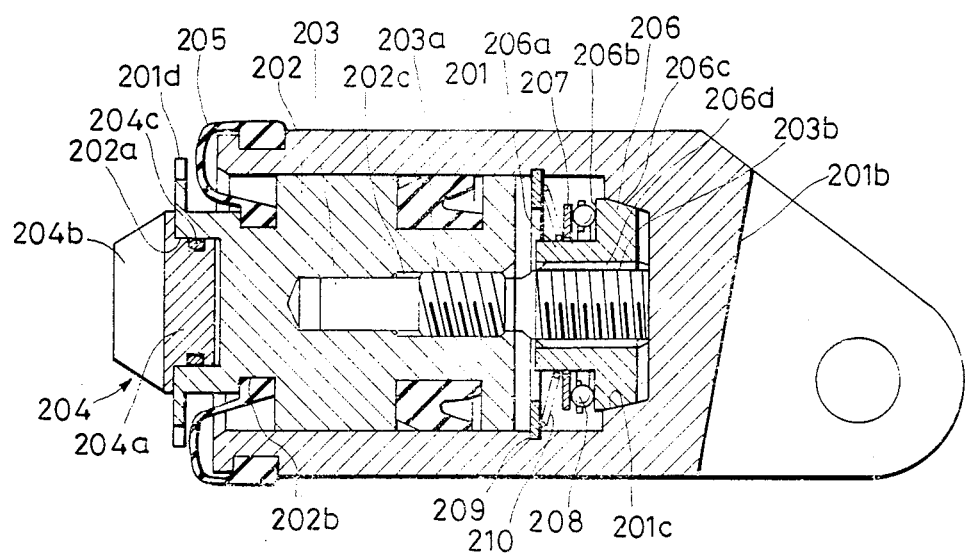
FIG. 6 is a sectional view of still another wheel cylinder embodying the present invention.

Referring to FIG. 6, a third example of the wheel cylinder with a self-contained auto-adjuster will be described. As shown therein, the wheel cylinder comprises a cylinder body 201 containing a piston 202. The outer end of the piston 202 is small in diameter, and the shaft 204a of a brake shoe catch member 204 is rotatably inserted into a circular hole 202a provided in the outer end of the piston 202. The piston 202 is revolved relative to a spindle 203, described later, and the catch member 204, by rotating a gear 202d installed at the front end thereof, so that the gap between the shoes can be adjusted manually. A friction ring 204c is used to prevent the piston 202 from rotating because of vibration. A dust boot 205 is installed between the outer periphery at the front end of the cylinder body 201 and an annular groove 202b at the front end of the piston 202. An adjust screw 203a set at the front end of the spindle 203 is screwed into a screw means 202c in the center of the piston 202. A drive screw 203b formed with a multiple thread is fixedly screwed at the rear end of the spindle 203, and the screw 206d of a nut member 206 engages with the drive screw 203b. The nut member 206 is composed of a cylindrical portion 206a, an annular side 206b and a conical head face 206c. A conical head hole conforming to the conical head face 206c is formed in the bottom of the cylinder 201 to act as a clutch face 201c. moreover, a ball bearing 208 is held between the annular side 206b and a stopper 207, and a conical coil spring 210 is held between the stopper 207 and a retainer 209 fixed to the inner peripheral face of the cylinder body 201 to bias the nut member 206 toward the clutch face 201c. A catch means 201b is used to catch the other brake shoe installed on the cylinder body 1. The set shoe gap between the brake drum (not shown) and the brake shoe is defined by the backlashes of drive screws 203b, 206d.

Figure 7:
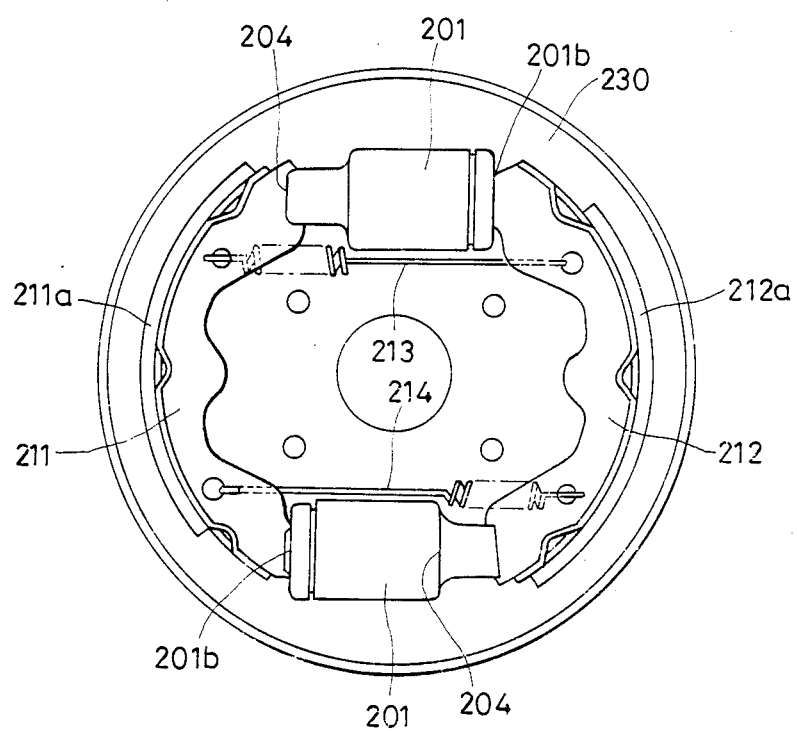
FIG. 7 is a schematic view of a two leading one-way brake with the wheel cylinder of FIG. 6 applied thereto.

A pair of the wheel cylinders constructed with a self-contained auto-adjuster are vertically symmetrically fixed to a backing plate 230 in the case of a two leading one-way brake, shown in FIG. 7. As shown in FIG. 7, one end of the brake shoe 211 mates with a mating groove 204b of the catch member 204, whereas the other end of the other brake shoe 212 mates with the catch means 201b of the brake shoe of the cylinder body 201. (The same arrangement is symmetrically applied to the upper side of the drawing).

The operation of this embodiment now will be described.

When hydraulic oil is introduced into the cylinder body 201 from outside while the shoe gap is set as described above, each piston 202 moves over the backlashes of the drive screws 203b, 206b to frictionally mate each of the linings 211a, 212a of the brake shoes 211, 212 fitted into the mating grooves 204b of the catch members 204 with a rotating brake drum (not shown), so that braking force is generated.

In case the linings 211a, 212a of the brake shoes 211, 212 have worn out to allow the shoe gap to become greater than the set gap, each piston 202 compensates for the backlashes of the drive screws 203b, 206d and continues to move further. The nut member 206 then works to slightly compress the conical coil spring 210, thereby breaking and revolving the conical head face 206c away from the clutch face 201c. This causes the spindle 203 to move together with the piston 202.

When the hydraulic oil is discharged from the cylinder body 201 by releasing the brake, each piston 202 retreats under the bias of the shoe return springs 213, 214. Although the spindle 203 is then forced into the nut member 206, the action of the drive screws 203b, 206d cause the spindle 203 to be revolved and screwed out of the piston 202. This is because the nut member 206 is unable to revolve, as the conical head face 206c mates with the clutch face 201c.

The shoe gap is thus finely adjusted according to the difference between the pitches of the adjust and drive screws 203a, 203b. Accordingly, it becomes possible to automatically suppress excessive adjustment because each piston 202 is screwed out of the spindle 203 in proportion to the deformation of the brake drum resulting from overheating when the brake is applied.

As is obvious from the above descreption, the wheel cylinder with a self-contained auto-adjuster according to the present invention has the following beneficial effects. Since the wheel cylinder has a completely self-contained mechanism for adjusting the gap between the brake drum and the shoe, the gap therebetween can be adjusted finely without operational trouble from foreign substances in the brake shoes and the like. It also becomes possible to prevent excessive changes of the gap therebetween resulting from the deformation of the brake drum because of overheating when the brake is applied.

What is claimed is:

1. A self-adjusting wheel cylinder for a drum brake including a brake drum and a brake shoe for exerting braking pressure on the drum with a shoe gap formed therebetween, comprising:

(a) cylinder means including an opening therein;

(b) hydraulic piston means including at least one piston slidably mounted in the opening for activating the brake shoe upon movement in one direction, and for releasing the brake shoe upon movement in the other direction; and (c) multiple adjusting screw means within the cylinder for automatically adjusting the limit of movement of the piston in response to changes in the shoe gap of the brake, the screw means including a spindle having external screw-threads on both ends, said spingle being threadably mounted within the piston to one end thereof and the other end having a pair of multiple drive screws thereon for defining a fixed movement limit of the piston, and nut means for attachment to the multiple drive screws, the nut means being adapted to rotate relative to the spindle when the brake shoe is activated, and the spindle being adapted to rotate relative to the nut means and the piston when the brake shoe is released.

2. The cylinder of claim 1 wherein the piston means includes first and second opposed pistons.

3. The cylinder of claim 1 wherein the nut means includes a nut having a conical head face, and the cylinder includes a corresponding convex clutch face surface for mating contact with the conical head face.

4. The cylinder of claim 3 wherein the nut includes an annular side thereon, and the nut means also includes a retainer fixed to the cylinder, a bearing abutting the annular side of the nut, and spring means between the retainer and the bearing for biasing the conical head face of the nut toward the clutch face.

5. The cylinder of claim 2 wherein the screw means includes a fixed screw mounted within the second piston and fixed against axial rotation; a spindle coupled to the fixed screw; and nut means threadably attached to the other end of the spindle.

6. The cylinder of claim 5 wherein the first piston includes a cavity therein having a conical concave head face on one end thereof, and the nut means includes a nut threadably attached to the spindle within the cavity, the nut including a conical convex face for mating contacting with the concave face of the cavity, and a retainer fixed in the cavity for defining a fixed gap between the nut and the retainer when the concave and convex faces are in contact with one another.

7. The cylinder of claim 4 also including a gear on the other end of the piston for manual adjustment of the brake.

8. The cylinder of claim 7 wherein the brake shoe includes a catch member, and the cylinder also includes a circular hole in the piston for attachment to the catch member, and friction ring means in the hole for reducing relative vibrational motion between the catch member and the piston.

9. A self adjusting wheel cylinder for a drum brake including a brake drum and a brake shoe for exerting braking pressure on the drum with a shoe gap formed therebetween comprising:

(a) cylinder means including an opening therein;

(b) hydraulic piston means including first and second opposed pistons slidably mounted in the opening for activating the brake shoe upon movement in one direction, and for releasing the brake shoe upon movement in the other direction;

(c) multiple adjusting screw means within the cylinder for automatically adjusting the limit of movement of the piston in response to changes in the shoe gap of the brake, including a fixed screw mounted within the second piston and fixed against axial rotation; a spindle coupled to the fixed screw; and nut means threadably attached to the other end of the spindle; and wherein the first piston includes a cavity therein having a conical concave head face on one end thereof, and the nut means includes a nut threadably attached to the spindle within the cavity, the nut including a conical convex face for mating with the concave face of the cavity, and a retainer fixed in the cavity for defining a fixed gap between the nut and the retainer when the concave and convex faces are in contact with one another; and (d) a plunger slidably mounted in the cylinder in alignment with the spindle and a wedge member coupled to the brake shoe, the plunger including a cutout portion sized for receiving the wedge member for locking the brake shoes against the brake drum.

10. The cylinder of claim 9, wherein said spindle is threadably attached to said nut by a first screw rotatable by axial force and to said second piston by a second screw unrotatable by axial force.

11. The cylinder of claim 10, wherein said first screw is provided with threads having the flank angle set so that the lead angle is greater than the angle of friction and said second screw is provided with threads having the flank angle set so that the lead angle is smaller than the angle of friction.

12. The cylinder of claim 11, wherein said first piston has an outer end portion provided with a first through-hole concentric with said spindle, said plunger is fitted into said first through-hole, a second through-hole perpendicular to said first through-hole at the front of said outer end portion to allow said wedge member to pass therethrough, and wherein said cutout portion is a longitudinal groove in said plunger having a tilted face at its bottom.

* * * * *